United States Patent [19]
Garland et al.

[11] Patent Number: 5,999,526
[45] Date of Patent: Dec. 7, 1999

[54] METHOD AND APPARATUS FOR DELIVERING DATA FROM AN INFORMATION PROVIDER USING THE PUBLIC SWITCHED NETWORK

[75] Inventors: Stuart Mandel Garland, Morton Grove; James Allen Kowal; Hilton Manuel Nicholson, both of Naperville; David B. Smith, Hinsdale, all of Ill.

[73] Assignee: Lucent Technologies Inc., Murray Hill, N.J.

[21] Appl. No.: 08/756,854

[22] Filed: Nov. 26, 1996

[51] Int. Cl.$^6$ .................................................. H04L 12/12
[52] U.S. Cl. .................. 370/352; 379/93.01; 395/200.49
[58] Field of Search ............................... 379/106.01, 113, 379/114, 115, 118, 130, 142, 93.01, 93.02, 93.03, 93.04, 93.05, 93.06, 93.07, 88.17, 67.1, 70, 84, 82, 209, 210, 211, 212, 106.03; 395/200.42, 200.47, 200.48, 200.49; 370/352, 356

[56] References Cited

U.S. PATENT DOCUMENTS

| 5,243,644 | 9/1993 | Garland et al. ........................ 379/106 |
|---|---|---|
| 5,359,641 | 10/1994 | Schull et al. ............................ 379/106 |
| 5,394,461 | 2/1995 | Garland .................................. 379/106 |
| 5,535,267 | 7/1996 | Schull .................................... 379/106 |
| 5,583,923 | 12/1996 | Hoy et al. ............................... 379/106 |
| 5,649,187 | 7/1997 | Hornbuckle . |  |
| 5,737,400 | 4/1998 | Bagchi et al. .......................... 379/142 |
| 5,799,072 | 8/1998 | Vulcan et al. .......................... 379/113 |

Primary Examiner—Huy D. Vu
Attorney, Agent, or Firm—Dennis J. Williamson

[57] ABSTRACT

The customer performs a search or otherwise defines selected data maintained by the information provider. Once the selected data is identified, the information provider maintains the requested data, typically by maintaining pointers identiying the data, but delays delivery of the requested data until the scheduled delivery time, such as a particular day and time requested by the customer or a non-peak period as determined by the information provider. When the information provider determines that delivery is appropriate, it makes a request for a suppressed ringing connection to a switching system. The switching system responds to the request for connection by creating a suppressed ringing connection where a silent alert tone or digital alert signal is transmitted to the customer premise equipment. The customer premise equipment includes a receiving system that receives one or more tones from the switching system over the suppressed ringing connection and becomes active. Upon being activated, the receiving system causes the customer's computer or portions of the computer such as a particular memory to power-up such that the computer can receive the data from the information provider.

28 Claims, 2 Drawing Sheets ical, the customer's computer site is connected to an information provider's data base allowing the customer to perform a search or otherwise identify selected data. The customer, after identifying the selected data, enters a data transfer request and the information provider downloads the selected data from its data base to the customer's computer in response to that request. One problem with such a system is that the customer must wait while the data is downloaded where the wait can be significant due to network congestion and/or low data speed connections. Such an operation is inefficient in that the customer must be idle and cannot perform further online functions until the downloading of data is completed. Moreover, because most search requests are made during peak hours, valuable network resources are tied up during the downloading of the data that could be otherwise employed.

METHOD AND APPARATUS FOR DELIVERING DATA FROM AN INFORMATION PROVIDER USING THE PUBLIC SWITCHED NETWORK

BACKGROUND OF THE INVENTION

This invention relates, generally, to a system for downloading data via a telecommunications network and, more particularly, to a system for the non-disruptive, scheduled or event driven downloading of data using a telemetry system.

It will be appreciated that a wide variety of information providers can be accessed over the telecommunications network, the Internet, local area networks or combinations thereof from a customer's computer site. Typically, the customer's computer site is connected to an information provider's data base allowing the customer to perform a search or otherwise identify selected data. The customer, after identifying the selected data, enters a data transfer request and the information provider downloads the selected data from its data base to the customer's computer in response to that request. One problem with such a system is that the customer must wait while the data is downloaded where the wait can be significant due to network congestion and/or low data speed connections. Such an operation is inefficient in that the customer must be idle and cannot perform further online functions until the downloading of data is completed. Moreover, because most search requests are made during peak hours, valuable network resources are tied up during the downloading of the data that could be otherwise employed.

It is also known in the art to delay the downloading of data to an off-peak time (i.e., in the middle of the night) to avoid the problems noted above. In such arrangements the information provider establishes a connection to the modem of the customer's computer and the network switching system transmits a power ringing signal over the public switched telephone network to the modem to "wake up" the modem for the data download. It will be appreciated that the power ringing signal is disruptive to the customer, especially for calls made during the middle of the night. Moreover, a regular call with power ringing may be forwarded to another termination (e.g. voice mail) or may be detected by an answering machine or other customer device before the modem goes "off-hook." Both scenarios are unacceptable for data connections. Moreover, these prior art systems require that the modem and computer be fully powered to receive the ringing signal.

An existing system for transferring data is known in the telemetry art where a customer's utility meter is accessed over the telephone network by the controlling utility such that a meter reading can be taken remotely. One telemetry system transmits a suppressed ringing signal to the customer's premise to create a connection without audible ringing and is disclosed in U.S. Pat. No. 5,189,694 issued to Garland on Feb. 3, 1993; U.S. Pat. No. 5,243,644 issued to Garland et al. on Sep. 7, 1993; U.S. Pat. No. 5,394,461 issued to Garland on Feb. 28, 1995; and U.S. Pat. No. 5,327,488 issued to Garland on Jul. 5, 1994. Such connections are commonly used by utilities to read utility meters or by other entities to transmit and gather data to and from a remote site. These systems have not been used for the non-disruptive, scheduled or event driven downloading of data to a customer premise.

Thus, a system for the non-disruptive scheduled or event driven downloading of data to a customer premise is desired.

SUMMARY OF THE INVENTION

The customer performs a search or otherwise defines or identifies selected data maintained by an information provider. Once the selected data is identified, the information provider maintains the requested data, typically by maintaining pointers identifying the data, but delays delivery of the requested data until the scheduled delivery time, such as a particular day and time requested by the customer or as determined by the information provider. When the information provider determines that delivery is appropriate, it makes a request for a suppressed ringing connection to a switching system. The switching system, following appropriate security clearances, responds to the request for connection by creating a suppressed ringing connection where a silent alert tone is transmitted to the customer premise equipment. The modem receives one or more alert tones from the switching system over the suppressed ringing connection and becomes active. The modem, upon being activated, causes the customer's computer (or intelligent peripheral such as an ADSI telephone or other scaled down device having data storage and display capabilities) or portions of the computer such as a particular memory to power-up such that the computer can receive the data from the information provider. Alternatively, a digital alert signal (rather than the analog alert tone) can be transmitted to a digital interface (rather than the modem) for activating the customer's computer. The digital connection can be ISDN, T-1 or any other high speed digital connection. Once the downloading of data is completed the information provider drops the carrier frequency or sends a data message to deactivate the customer's modem and computer or the switching system sends another signal to deactivate the modem and computer and return to the pre-suppressed ringing state.

DETAILED DESCRIPTION

Figure 1:
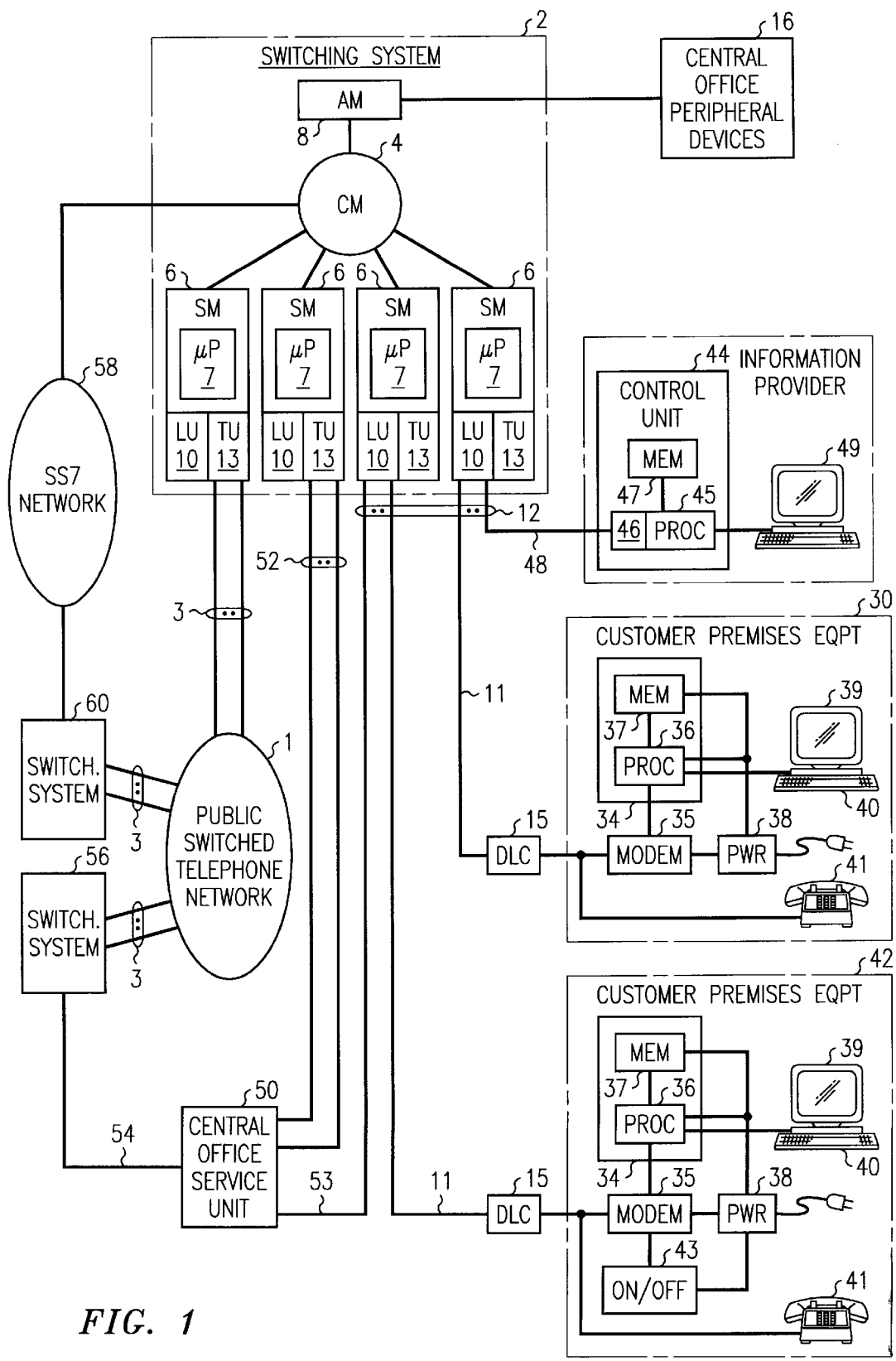
FIG. 1 is a block diagram showing the system of the invention.

The system of the invention is used in a public switched telecommunications network such as is illustrated in FIG. 1 and consists of a plurality of switching systems connected to one another in the public switched network 1 over interoffice trunks 3 as is well understood. Referring to switching system 2, each switching system can consist of one of the family of 5ESS® switches manufactured and sold by Lucent Technologies Inc. and described in U.S. Pat. No. 4,592,048 issued to Beckner et al. on May 27, 1986 and in *AT&T Technical Journal*, Vol. 64, No. 6, Part 2, pp. 1305–1524, or any other similar switching system. Switching system 2 operates as is well known in the art to switch voice and data through the network. The architecture of such a switching system is shown and includes a communication module 4 forming a hub and having a plurality of switch modules (SM) 6, and an administration module (AM) 8 emanating therefrom. Each switch module 6 is controlled by microprocessor 7 and provides call processing, space division switching, and signaling for the lines and trunks to which it is connected. Line units (LU) 10 provide interface to the local loops 12 that connect to the customer premise equipment and trunk units (TU) 13 provide interface to the trunks 3 that connect to other switches in the network. The administration module 8 provides functions that can be centralized such as maintenance control, craft interface, text and data base management, call routing and time slot allocation. The administration module 8 consists of a control unit such as the Lucent Technologies Inc. 3B21D duplex processor and a main memory. In some switching systems, the administration module is assisted by a separate processor that performs some administrative functions. The administration module 8 also includes an input/output processor providing communication between the switching system 2 and central office peripheral devices 16 such as terminals, printers and the like. Communication module 4 is the hub of the switching system and allows communication between the administration module 8 and the switch modules 6. Communication module 4 consists of a message switch that provides the administration module-to-switch module and switch module-to-switch module message communication, and a time multiplexed switch providing the switch module-to-switch module and switch module-to-administration module time slot connection for voice and data communication and the clock distribution. While the architecture of one particular switching system has been shown and described, it will be understood that any similar switching system can be used.

The local loops 12 typically consisting of a pair of copper wires, coaxial cables, fiber or any similar transmission media defining local lines 11 that connect switch 2 to customer premise equipment (CPE) such as telephones, utility meters, appliances, multimedia equipment, terminals or the like. The local loops may also include digital loop carrier systems (DLC) 15 such as the SLC® series of digital loop carriers manufactured and sold by Lucent Technologies Inc. The customer premise equipment includes a receiving system for receiving and storing the downloaded data. One arrangement of the customer premise equipment is illustrated at 30 where transmission member 11 is terminated at a modem 35. Modem 35 and computer 34, consisting of a processor 36 and memory 37, are arranged in series as is known in the art. A power supply 38 for powering the customer premise equipment and a display (monitor) 39 and customer interface (keyboard) 40 are connected to the processor as is known in the art. Modem 35 can either be a stand alone unit or it can be integral to computer 34 or other terminal or intelligent peripheral. In either arrangement, the modem is connected to the telephone line in parallel with all other devices such as telephone 41. In the system of the invention, the modem 35 includes alert circuitry for receiving an analog tone alert from the switching system rather than the power ringing alert circuitry of the prior art modems. If a digital alert signal is used instead of the tone alert, the modem 35 is replaced by a digital interface for receiving the digital alert signal and activating the computer.

In an alternate embodiment of the customer premise equipment shown at 42, the customer's computer is not continuously powered up. Rather, the modem 35 or digital interface is connected to power on/off circuitry 43. The alert circuitry in the modem 35 or digital interface are continually powered using a small amount of power from a bleed line from the power supply, a battery or a charged capacitor. When the alert tone or digital alert is received by the alert circuitry a signal lead, relay, or electronic switch from the modem 35 or digital interface to the on/off circuitry 43 is activated to allow power supply 38 to power up the computer (or relevant portions of the computer).

After being activated, called modem 35 sends a unique signal (Reverse Carrier Tone) to the calling modem. In some cases the tones are reversed in that the calling modem initiates the modem identification tone. After the identification tone, modem 35 follows a standard speed and sync technique to establish the data communications as is known in the art. After speed and sync are established, a data session is established.

An information provider's control unit 44 consisting of a processor 45, modem 46 and memory 47 is provided. The information provider can consist of any entity providing on line searching or data retrieval services or any entity having stored information intended for dissemination such as government agencies. Control unit 44 is connected to the switching system 2 over a dedicated or dial up line 48. Alternatively, control unit 40 could be connected to the switching system via the Internet. Control unit 40 may include an interface such as a keyboard and monitor 49 as will be understood.

A central office service unit (COSU) 50 is connected to the switch 2 over one or more utility telemetry trunks (UTT) 52 and by a dial up or dedicated line 53. Moreover, COSU 50 could be integrated into one of the switching systems in the network rather than being a stand alone unit. As will be appreciated, line 53 can be connected to line 48 through the switch fabric of switching system 2 in the same manner as voice and data connections to allow control unit 44 to communicate with COSU 50. As explained in detail in U.S. Pat. No. 5,189,694 issued to Garland on Feb. 23, 1993; U.S. Pat. No. 5,243,644 issued to Garland et al. on Sep. 7, 1993; U.S. Pat. No. 5,394,461 issued to Garland on Feb. 28, 1995; and U.S. Pat. No. 5,327,488 issued to Garland on Jul. 5, 1994, COSU 50 and UTT 52 are used to make a suppressed ringing connection between a first entity having access to the COSU and a second entity. The system of the invention uses the suppressed ringing connection to allow the control unit 44 to cause the switch network to silently alert modem 35 such that the control unit 44 and computer 34 can communicate with one another without an audible power ringing signal being heard at the customer premise. While such a suppressed ringing connection has previously been used to allow a utility to initiate a connection with an outbound telemetry interface unit, it has not been used for silently alerting a modem thereby allowing the non-disruptive downloading of data to be performed.

COSU 50 can be connected to more than one switching system as illustrated in FIG. 1 where another UTT 54 connects the COSU 50 to additional switching systems 56. Alternatively, a common channel signaling network such as SS7 network 58 can be used to connect COSU 50 to a second switching system 60 via the first switching system as is known in the art. As a result, the control unit 44 can be connected to TIUs hosted by different switching systems in the network. COSU 50, as is known, creates a one to many connection in which line 48 (which is switch connected to line 53 through the switch fabric) can be connected to a plurality of UTTs 52. In this manner, the COSU serves to multiplex and demultiplex the signals as they are transmitted between line 53 and UTTs 52. UTTs 52 are, in turn, connected to a multiplicity of local lines 11 via the switch fabric.

Figure 2:
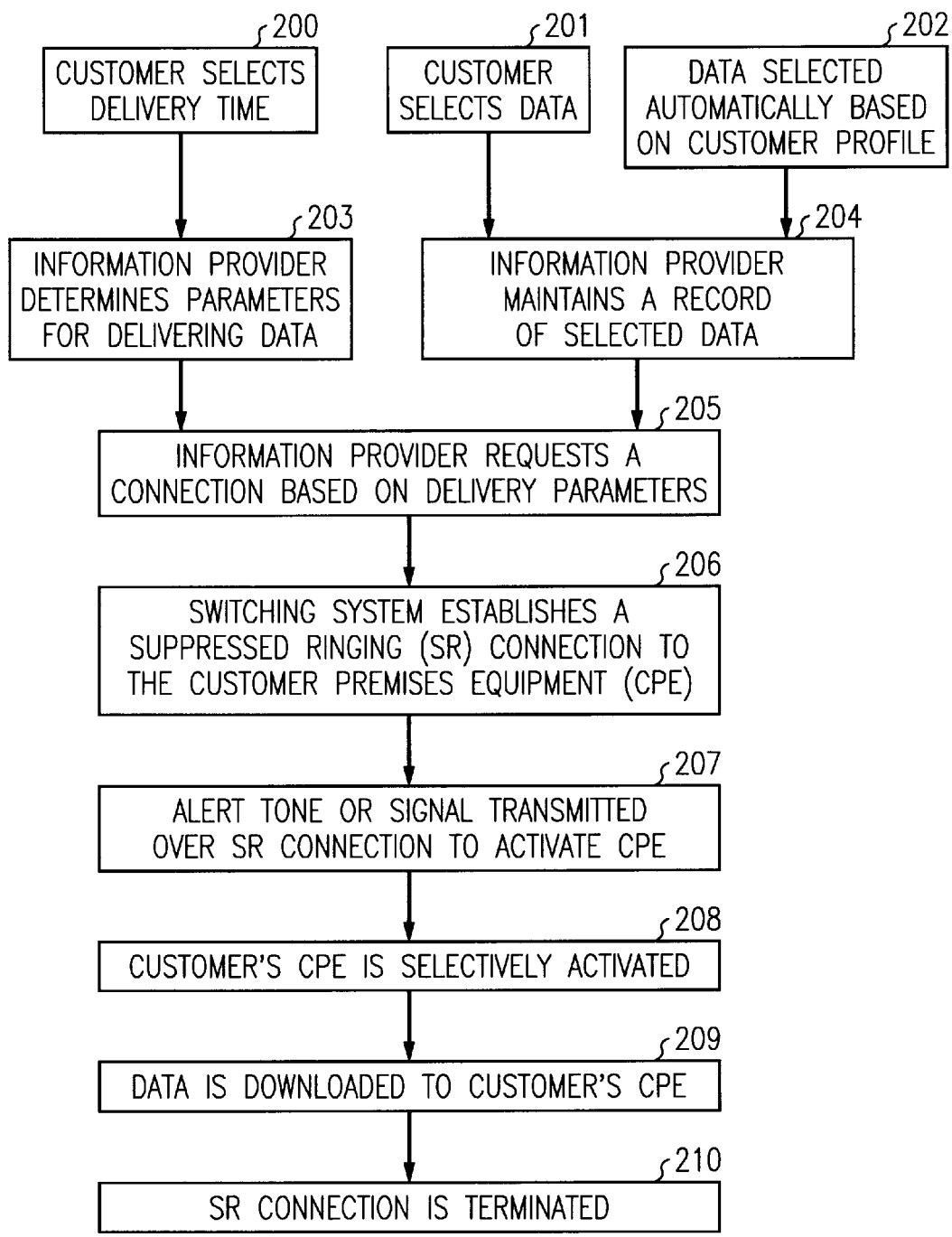
FIG. 2 is a flow chart describing the method of operation of the system of the invention.

Referring more particularly to FIG. 2, the operation of the system will be described. The customer accesses the information provider's data base via its computer and performs a search or otherwise defines selected data maintained by the information provider as is known (block 201). In addition to a customer initiated search, it is contemplated that the selected data can be obtained automatically by the information provider based on a stored customer profile or other customer defined parameter (block 202). For example, the customer profile could direct that the information provider compile data on a certain subject (i.e. select stock prices, sporting scores or the like) on a periodic basis (i.e. weekly). Moreover, the profile could be event driven in that the selected data is transmitted whenever a customer specified event occurs. The specific parameters defined in the customer profile are controllable at the customer's request. For example, a news clipping service could search available data bases and transmit selected data when a customer selected topic is found such as by stock movements, advertising topics, news events or the like. The customer profile can also combine parameters such that the selected data is gathered based on the occurrence of an event and is delivered based on the customer's requested delivery schedule. If the information provider receives information from other sources, the customer profile can be used as a filter to prevent delivery of unwanted information. Finally, multiple profiles can be used for a single billing customer such that individual family members can have separate profiles under a single customer account.

Once the selected data is identified the scheduled delivery parameters are determined (block 203) either from the customer's explicit request for a delayed delivery (block 200), such as by specifying a time certain for the data delivery to occur, or by reference to the parameters defined in the customer profile and/or based on network resource availability. Alternatively, the information provider could offer delayed delivery as the default option such that the customer must request immediate delivery. The information provider maintains a record of the requested data in memory but delays delivery of the requested data until the scheduled delivery time, such as the particular day and time requested by the customer or a non-peak period as determined by the information provider (block 204). When the information provider determines that delivery is appropriate, it makes a request for a connection to switching system 2 (block 205). If the customer is connected to the information provider at the determined delivery time, the information provider notifies the customer and the customer may permit the download or request a further delay. The request for the connection can be made manually or automatically. For example, control unit 44 of the information provider can be programmed to automatically initiate the call at the determined time or the request can be made manually via interface 49 such as from a customer service station. The request for a connection includes a unique identifier that identifies the modem or intelligent peripheral being called. The identifier could be the telephone number of the local loop hosting the modem or it could be another identifier. If an identifier other than a telephone number is used, a translation between the identifier and the telephone number of the customer being called is made in a data base that is accessible by the switching system.

The COSU 50 receives the request for connection from the controlling entity via the switch fabric of switching system 2 and the COSU transmits the request to the switching system. The switching system 2 responds to the request for connection by creating a suppressed ringing connection where a silent alert tone is transmitted to the customer premise equipment (block 206). In those architectures where the COSU functionality is integrated in the switching system, the switching system alerts the CPE. Note, the suppressed ringing connection could also include abbreviated ringing such as disclosed in U.S. Pat. No. 5,243,644 and 5,452,343 issued to Garland et al. to allow the tone to pass through concentrated digital loop carriers 15 such as the Mode II SLC® 96 manufactured and sold by Lucent Technologies Inc. that are commonly found serving subscriber lines. The modem receives one or more tone alerts or the digital interface receives a digital alert signal from the switching system over the connection established using suppressed ringing and becomes active without power ringing in response to the tone or digital signal (block 207). Specifically, the tone alert or digital signal alert would be transmitted to the customer premise equipment after the suppressed ringing connection is established. The tone alert could be of several forms including single tones, dual tones, multifrequency or the like and the digital signal alert could consist of any predetermined bit sequence. The tone alert causes the modem to go off-hook electrically and become active. The digital alert signal does not cause the digital interface to go off-hook, rather the control unit 44 transmits a bit stream through the switching system to the digital interface indicating the same functionality as "off-hook." In addition to the several forms of alert tones, different alert tones or bit sequences could cause different actions. For example, tone 1 or bit sequence 1 could cause software routine1 to be activated or hardware component1 to be utilized while tone 2 or bit sequence 2 could cause software routine2 to be activated or hardware components2 to be utilized. In the active state, the remainder of the computer equipment and software (or a subset of equipment and/or software) are brought to a full power up state through the arrangement described above (block 208). The data is downloaded and the computer can accept and store the data, as well as filter, analyze and act on the data, based on the received tones and local software instructions (block 209). Once the downloading of data is completed the information provider can drop the carrier tone to the customer's modem, deliver a data message to the customer digital interface to terminate the call or the switching system could send a signal in response to which the modem or digital interface turns off computer 34 (block 210).

While the above-identified operation sequence describes "off-hook" operation, it is to be understood that the suppressed ringing connection can be established using an on-hook implementation as described in U.S. Pat. No. 5,189,694 issued to Garland on Feb. 3, 1993. In such an operation, if the customer goes off-hook (i.e. lift the receiver of a telephone to make a voice call) while on-hook data transmission is occurring, the switching system 2 detects the off-hook state directly, ends the data transmission and provides dial tone to the customer.

The data tone alert could also be enhanced with the subaddress disclosed in U.S. Pat. No. 5,509,054 issued to Garland. The subaddress could identify the destination or component to receive the information. For example, the subaddress, if used in a call setup situation, could identify destinations on a home LAN. Further examples of call setup destination targets are a) the modem itself (new program or diagnostics), b) the computer in general, c) the hard disk, or d) the display. Alternatively, the subaddress could be passed to the application software which would activate the addressed component after call setup is complete.

Because allowing access to a customer's computer raises security concerns, the customer, when making the initial request for the data transfer, can provide a personal identification number (PIN), password, security code or other security identifier to the information provider. The security identifier could be for a single or multiple access. The information provider retains the security identifier with the requested data and, upon activating the receiving system, transmits the security identifier to the modem. If the security identifier is not valid the modem or software terminates the connection. The modem or software only allows access to the memory and operating systems of computer 34 after checking the validity of the security identifier. As further security protection, the security identifiers could allow access only to particular areas of the computer. For example, access could be allowed only to a particular text area of the computer memory but not to executable areas or to particular customer defined text areas. Limiting access to write and read areas also provides additional virus protection. Access control is provided by software that oversees protection of memory by temporarily assigning non-read/write characteristics to the appropriate file area. Finally, the communications protocol of the modem could be restricted to one way (incoming) data flow when it is activated using the security identifier thereby preventing the outflow of data from the customer's computer. The initial alert tone or signal could also initiate a software subsystem such as virus scan software or the like.

Information from the information provider could be downloaded as numbered blocks of data or percent of file transferred to facilitate the resending of data, if necessary. In this case, if a transmission error or interruption occurs, it is necessary to resend only that portion of the data that was not properly transmitted, as identified by the numbered blocks. The transmission protocol could also include a time indicator, defining the amount of time the download will take, to be displayed at the customer equipment giving the customer an indicator of remaining time for the download to be completed.

If the customer's line is busy when the suppressed ringing connection is attempted, the information provider could invoke a call back routine or the network could provide an auto call-back functionality. This auto call-back functionality could either require that telephone network notify the information provider when the customer line is available or that the telephone network automatically establish a suppressed ringing connection between the customer and the information provider when both lines are idle. Further, if the customer line was busy for more than a predetermined period of time, the network could provide an audible or visual facsimile, message indicator, voice message indicator, computer data message indicator, or a single message indicator at the customer premise. For example, the FAX message indicator identifies that a particular information provider has a FAX message for the customer. Alternatively, the information provider could provide the message indicator in real time over a second line. For example, during a telemetry call, a message is displayed indicating that the telemetry call is in progress thereby alerting the customer not to pick up the telephone handset and disturb the call.

Because the data transfer occurs silently when the customer is presumably not at the computer, it is beneficial to provide an indication to the customer that a data set is waiting at the server to be delivered (message waiting) or that the data download has occurred (message delivered). The message can indicate the type of message delivered to the customer such as text, computer program, fax or the like. To accomplish this, a message is delivered that causes an indicator (visual or audible) to be activated at the customer location. Where a separate stand alone modem is used, the indicator can consist of a visual indicator such as lighting a lamp on the modem. Alternatively, an icon can be employed that will appear on the computer screen when the customer logs on or an intelligent peripheral including a visual display can be used. It will also be understood that an audible indicator can be given if, for example, the customer's computer includes multimedia equipment.

Charges for the call from the information provider to the customer could be reverse billed to the customer, if desired. For example, the information provider could place a call to the customer where the first part of the telemetry call was free of telecommunication charges (e.g. local or long distance charges), and then when the call was accepted, via PIN or other protection, the telecommunications charges for the remainder of the call would be charged to the customer premise (reverse charging) or information provider. A subaddress could be implemented where the subaddress accesses a software program in the customer's computer. The software program receives the charge back basis (content charge rate for the information) and bases acceptance or rejection if the information based on the received rate during the initial communications period per customer selections. If the rate is over a customer determined limit, the connection is terminated without the customer incurring charges. Alternatively, information may be transmitted in priority order until the charges reach a customer defined monetary limit at which time the connection is dropped by the customer premise equipment.

It is also possible that the information provider may have many destinations (i.e. different customers or different computers of the same customer) requesting the same data at approximately the same time. In this case, a broadcast data bridge may be constructed in the telephone network where the information provider transmits the data to the network and the bridge sends the data to the plural destinations. One such bridge could consist of a modem connected to the information provider, this modem is connected to parallel modems, each of which is connected to the multiple customer's computers. A call to each of the customer's computers would be set up and when they are all connected, one transmission from the information provider would take place. Any broadcast service connection that does not include a proper security identifier is dropped by the customer premise equipment during initial communication.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. A method for downloading data comprising the steps of:
    a) establishing a first connection between a customer computer and an information provider;
    b) identifying data to be downloaded from said service provider to said computer;
    c) terminating said first connection;
    d) establishing a suppressed ringing connection between said service provider and said computer; and
    e) downloading said data from said service provider to said computer.

2. The method according to claim 1, wherein the step of identifying a download of data includes the step of specifying a specific time at which the step of downloading said data is to occur.

3. The method according to claim 1, wherein the step of downloading said data includes the step of determining an off-peak time at which said step of downloading said data is to occur.

4. The method according to claim 1, wherein the step of establishing a first connection includes the step of establishing said first connection through a switching system.

5. The method according to claim 1, further including the step of limiting access to selected areas of the computer.

6. The method according to claim 1, further including the step of transmitting a security identifier over said first connection from said requesting computer to said service provider.

7. The method according to claim 6, further including the steps of transmitting said security identifier over said suppressed ringing connection from said service provider to said requesting computer and said computer receiving said download of data only after verifying said security identifier.

8. The method according to claim 4, further including the step of transmitting a silent alert over the suppressed ringing connection to said computer.

9. The method according to claim 6, further including the step of using said security identifier to allow the transmission of data only from the service provider to the computer via the suppressed ringing connection.

10. The method according to claim 1, further including the step of activating a message indicator.

11. The method according to claim 1, wherein said suppressed ringing connection consists of a first connection between the information provider and a switching system and a second connection between the switching system and a plurality of requesting computers, further including the steps of transmitting said data from said information provider to said switching system and broadcasting the data from said switching system to the plurality of requesting computers.

12. The method according to claim 1, wherein said customer equipment includes a modem and a computer, delivering an alert tone over said suppressed ringing connection to activate the modem and establish a communications link.

13. The method according to claim 1, wherein said customer equipment includes a digital interface and a computer, delivering a digital short signal over said suppressed ringing connection to activate the digital interface and establish a communications link.

14. The method according to claim 1, wherein said data is identified by a request from said customer computer to said service provider.

15. The method according to claim 1, wherein the step of downloading the data includes the step of determining a time for delivery.

16. The method according to claim 15, wherein the step of determining a time for delivery includes the step of accessing a customer profile.

17. The method according to claim 15, wherein the step of determining a time for delivery includes the step of determining the availability of network resources.

18. The method according to claim 15, wherein the step of determining a time for delivery is based on the occurrence of a specified event.

19. The method according to claim 1, further including the step of powering the computer based on receipt of an alert over the suppressed ringing connection.

20. The method according to claim 1, further including the step of powering selected portions of the computer based on receipt of an alert tone over the suppressed ringing connection.

21. The method according to claim 1, further including the step of powering selected portions of the computer wherein the selected portions are determined based on a subaddress.

22. The method according to claim 1, wherein the information provider is allowed access to a specific area of the computer based on subaddressing.

23. The method according to claim 1, wherein the information provider is allowed access to different areas of the computer based on receipt of different tones.

24. The method according to claim 1, further including the step of limiting access of the information provider to particular software routines in the computer.

25. The method according to claim 1, further including the step of limitng access of the information provider to particular hardware in the computer.

26. The method according to claim 10, wherein the message indicator identifies a specific message type.

27. The method according to claim 10, wherein the message indicator indicates that a data message has been delivered to the customer computer.

28. The method according to claim 10, wherein the message indicator indicates that a telemetry call is in progress.

* * * * *